(12) United States Patent
Gargalaka, Jr. et al.

(10) Patent No.: US 10,857,767 B2
(45) Date of Patent: Dec. 8, 2020

(54) MULTILAYER STRUCTURES, MULTILAYER FILMS, AND PACKAGES FORMED THEREFROM

(71) Applicant: Dow Global Technologies LLC, Midland, MI (US)

(72) Inventors: João Gargalaka, Jr., São Paulo (BR); Nicolas Cardoso Mazzola, São Paulo (BR); Rafaela De Foggi Carioli, São Paulo (BR); Marcelo Delmar Cantu, São Paulo (BR); Jorge Caminero Gomes, São Paulo (BR)

(73) Assignee: Dow Global Technologies LLC, Midland, MI (US)

(*) Notice: Subject to any disclaimer, the term of this patent is extended or adjusted under 35 U.S.C. 154(b) by 101 days.

(21) Appl. No.: 16/321,134

(22) PCT Filed: Jul. 27, 2017

(86) PCT No.: PCT/US2017/044097
§ 371 (c)(1),
(2) Date: Jan. 28, 2019

(87) PCT Pub. No.: WO2018/022839
PCT Pub. Date: Feb. 1, 2018

(65) Prior Publication Data
US 2019/0152205 A1    May 23, 2019

Related U.S. Application Data

(60) Provisional application No. 62/367,863, filed on Jul. 28, 2016.

(51) Int. Cl.
*B32B 27/08* (2006.01)
*B32B 27/30* (2006.01)
(Continued)

(52) U.S. Cl.
CPC ............. *B32B 27/08* (2013.01); *B32B 7/06* (2013.01); *B32B 27/306* (2013.01);
(Continued)

(58) Field of Classification Search
CPC ..... B32B 27/08; B32B 27/306; B32B 27/308; B32B 27/32; B32B 27/34; B32B 7/06;
(Continued)

(56) References Cited

U.S. PATENT DOCUMENTS

2009/0035594 A1   2/2009 Lee et al.
2013/0052471 A1   2/2013 Botros
(Continued)

FOREIGN PATENT DOCUMENTS

WO   2014043522   3/2014

OTHER PUBLICATIONS

International Preliminary Report on Patentability for related PCT Application PCT/US2017/044097, dated Feb. 7, 2019 (13 pgs).
(Continued)

*Primary Examiner* — Michael C Miggins
(74) *Attorney, Agent, or Firm* — Brooks, Cameron & Huebsch, PLLC

(57) ABSTRACT

Embodiments relate to multilayer structures, multilayer films, and packages formed therefrom. As an example, a multilayer structure can include a multilayer structure comprising a polyolefin sealant layer, a coupling layer on the polyolefin sealant layer, where the coupling layer includes a polyolefin and a maleic anhydride grafted (MAH) polymer, where the total amount of MAH polymer is from 15 weight percent to 50 weight percent of a total weight percent of the coupling layer, where the polyolefin is selected from the group consisting of a high pressure low density polyethylene, a high density polyethylene, an ethylene acrylic acid copolymer, an ethylene(meth)acrylic acid copolymer, pro-
(Continued)

pylene based plastomers, ionomers or a combination thereof, and a barrier layer directly on the coupling layer.

13 Claims, 4 Drawing Sheets

(51) Int. Cl.
*B32B 27/32* (2006.01)
*B32B 27/34* (2006.01)
*B32B 7/06* (2019.01)
*B65D 65/40* (2006.01)

(52) U.S. Cl.
CPC ............ *B32B 27/308* (2013.01); *B32B 27/32* (2013.01); *B32B 27/34* (2013.01); *B65D 65/40* (2013.01); *B32B 2270/00* (2013.01); *B32B 2307/31* (2013.01); *B32B 2307/72* (2013.01); *B32B 2307/7244* (2013.01); *B32B 2307/748* (2013.01); *B32B 2439/40* (2013.01)

(58) Field of Classification Search
CPC ........ B32B 2307/72; B32B 2307/7244; B32B 2307/748; B32B 2439/40; B32B 2270/00; B32B 2307/31; B65D 65/40
See application file for complete search history.

(56) References Cited

U.S. PATENT DOCUMENTS

2014/0221951 A1  8/2014  Chang et al.
2015/0041475 A1  2/2015  Swamy
2015/0336363 A1  11/2015  Barbaroux et al.

OTHER PUBLICATIONS

International Search Report & Written Opinion for related PCT Application PCT/US2017/044097, dated Jan. 4, 2018 (20 pgs).

MULTILAYER STRUCTURES, MULTILAYER FILMS, AND PACKAGES FORMED THEREFROM

This application is a National Stage Application under 35 U.S.C. § 371 of International Application Number PCT/US2017/044097, filed Jul. 27, 2017 and published as WO 2018/022839 on Feb. 1, 2018, which claims the benefit to U.S. Provisional Application 62/367,863, filed Jul. 28, 2016, the entire contents of which are incorporated herein by reference in its entirety.

FIELD

Embodiments relate to multilayer structures, multilayer films, and packages formed therefrom.

BACKGROUND

Some packages may employ a seal to close a volume of the package to a surrounding environment. Such a seal may be subsequently opened. Seals that reliable and reproducible open may be desirable for a variety of applications.

SUMMARY

The present disclosure provides a multilayer structure including a polyolefin sealant layer, a coupling layer on the polyolefin sealant layer, where the coupling layer includes a polyolefin and a maleic anhydride grafted (MAH) polymer, where the total amount of MAH polymer is from 15 weight percent to 50 weight percent of a total weight percent of the coupling layer; where the polyolefin is selected from the group consisting of a high pressure low density polyethylene, a high density polyethylene, an ethylene acrylic acid copolymer, an ethylene(meth)acrylic acid copolymer, propylene based plastomers, ionomers, polybutylene, or a combination thereof, and a barrier layer directly on the coupling layer.

The present disclosure provides a multilayer structure including a polyolefin sealant layer, a coupling layer on the polyolefin sealant layer, where the coupling layer includes a polyolefin and a maleic anhydride grafted (MAH) polymer, where the total amount of MAH polymer is from 30 weight percent to 50 weight percent of a total weight percent of the coupling layer; where the polyolefin is selected from the group consisting of a high pressure low density polyethylene, a high density polyethylene, an ethylene acrylic acid copolymer, an ethylene(meth)acrylic acid copolymer, propylene based plastomers, ionomers, polybutylene, or a combination thereof, and a barrier layer directly on the coupling layer The present disclosure provides a multilayer film comprising a first film and a second film, where at least the first film or the second film includes: a polyolefin sealant layer, a coupling layer on the polyolefin sealant layer, where the coupling layer includes a polyolefin and a particular amount of maleic anhydride grafted (MAH) polymer in a range from 35 weight percent to 50 weight percent of a total weight percent of the coupling layer, where the polyolefin further comprises a blend of a polypropylene-based plastomer and a low density polyethylene (LDPE), where the multilayer film is to cohesively fail along at least a portion of an interface between the first film and the second film, and a barrier layer directly on the coupling layer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1A:
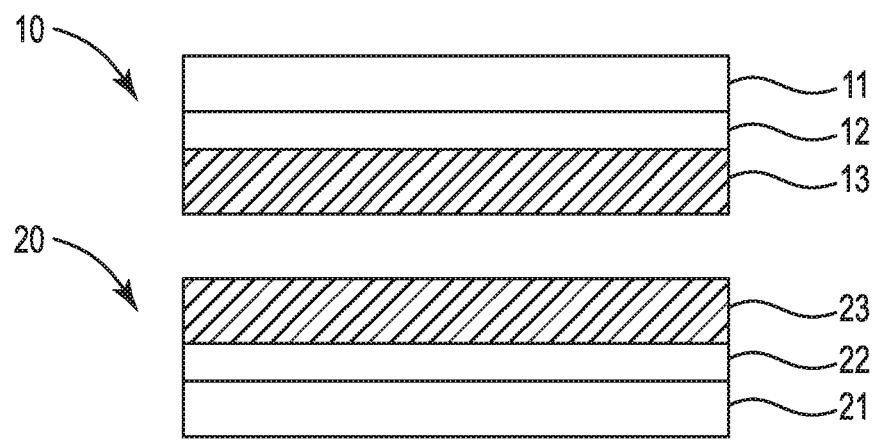
FIG. 1 illustrates an example of a seal formed using an example of a multilayer structure according to the present disclosure

Seals that reliably open via a particular opening mechanism can be desired for a variety of applications. For example, it may desirable for a seal to open via a cohesive failure to ensure a mechanically reproducible and aesthetically desirable seal in various different package and lid compositions (e.g. rigid containers and lids, flexible containers and lids). However, a particular opening mechanism by which a seal opens may be a function of a composition of the seal, a thickness of the seal, and/or sealing conditions (time, pressure, temperature, etc.), among others. Moreover, it may be desirable for a seal to have various barrier properties such as oxygen barrier properties. However, various seals that attempt to provide barrier properties and a reliable opening mechanism such as via cohesive failure may employ at least seven layers and therefore may be undesirably thick (e.g., having a total of at least seven layers and/or a thickness in excess of 250 microns) for some applications, among other difficulties such as utilizing different compositions. As a result, there remains a need for multilayer structures that reliably open via a particular opening mechanism that can, in some embodiments, provide barrier properties and/or be used in a variety of applications (e.g., has a desired thickness) and with a wide variety of sealing conditions.

Accordingly, embodiments of the present disclosure are directed to multilayer structures, multilayer films, and packages formed therefrom. Notably, the multilayer structures and multilayer films, in some embodiments, include fewer layers and/or desirably less thickness than structures and multilayer films of other approaches and yet provide a reliably and reproducibly open via a cohesive failure, as described herein.

As used herein, the term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

As used herein, the term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

As used herein, the term "olefin-based polymer," as used herein, refers to a polymer that comprises a majority amount of polymerized olefin monomer, for example ethylene or propylene (based on weight of the polymer) and, optionally, may contain at least one comonomer.

As used herein, the term "ethylene-based polymer," as used herein, refers to a polymer that comprises a majority amount of polymerized ethylene monomer (based on weight of the polymer) and, optionally, may contain at least one comonomer.

As used herein, the term "ethylene/a-olefin interpolymer," as used herein, refers to an interpolymer that comprises a majority amount of polymerized ethylene monomer (based on the weight of the interpolymer) and at least one a-olefin.

As use herein, the term, "ethylene/α-olefin copolymer," as used herein, refers to a copolymer that comprises a majority amount of polymerized ethylene monomer (based on the weight of the copolymer), and an a-olefin, as the only two monomer types.

As used herein, the term "propylene-based polymer," as used herein, refers to a polymer that comprises a majority amount of polymerized propylene monomer (based on weight of the polymer) and, optionally, may comprise at least one comonomer.

As used herein, the term "composition," as used herein, includes a mixture of materials which comprise the composition, as well as reaction products and decomposition products formed from the materials of the composition.

As used herein, the terms "blend" or "polymer blend," as used herein, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

As used herein, the term "ionomer," as used herein means (or includes) polyethylene based copolymers modified with cations to provide ionic links. These copolymers are well known and described at The Wiley Encyclopedia of Packaging Technology or Handbook of Engineering and Specialty Thermoplastics, Polyolefins and Styrenics.

As used herein, the terms "cyclic olefin copolymers" and "COC," are known and described, for example, in EP-A-0 407 870, EP-A-0 485 893, EP-A-0 503 422, and DE-A-40 36 264, the disclosures of which are incorporated herein by reference.

FIG. 1 illustrates an example of a seal formed using an example of a multilayer structure according to the present disclosure. As shown in FIG. 1A, a multilayer structure such as those formed into a first film 10 can include a barrier layer 11, a coupling layer 12 and a polyolefin sealant layer 13. Likewise, a second film 20 can include a barrier layer 21, a coupling layer 22 and a polyolefin sealant layer 23.

Notably, a barrier layer (e.g., barrier layer 11) is directly on a coupling layer (e.g., coupling layer 12) in contrast to other approaches that may employ an intervening layer (e.g., an intervening tie layer). As used herein, it is understood that when an element is referred to as being "directly on", "directly connected", or "directly coupled to" another element, it is directly on, directly connected, or directly coupled to the other element without any intervening elements present. Similarly, it will be understood that when an element is referred to as being "on," "connected to", "coupled to", or "coupled with" another element, it can be directly on, connected, or coupled with the other element or intervening elements may be present.

While FIG. 1 illustrates each of the first film 10 and the second film 20 including a coupling layer, the disclosure is not so limited. Rather, in some embodiments, either the first film 10 or the second film 20 can comprise a film including a coupling layer while the other of the first film 10 or the second film 20 can instead comprise a commercially available thermoforming film (such as those without a coupling layer), as described herein.

In various embodiments, the first film 10 or the second film 20 can have a total number of layers from three layers to five layers. For instance, as illustrated in FIG. 1A, the first film can include a total of three layers and the second film 20 can include a total of three layers. However, the present disclosure is not so limited. Rather, a total number of layers of the first film 10 and/or the second film 20 can be varied. For example, the film 10 can include the same layers as illustrated in FIG. 1A but with the addition of one or more additional layers such as a barrier layer, a tie layer, and/or another type of layer. As such, in some embodiments the first film 10 can include a total number of layers from three layers to eleven layers. Similarly, in some embodiments, the first film 10 can include a total number of layers from three layers to eleven layers.

Figure 1B:
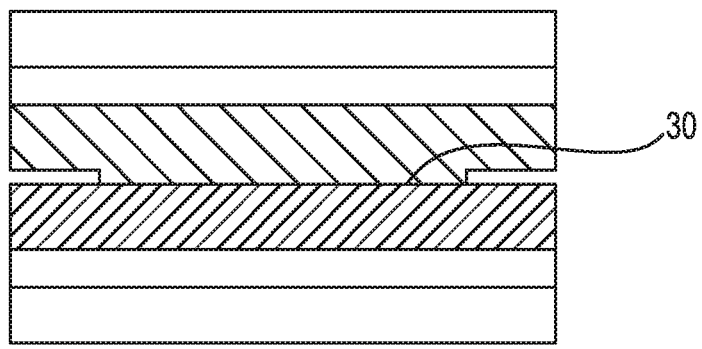
Figure 1C:
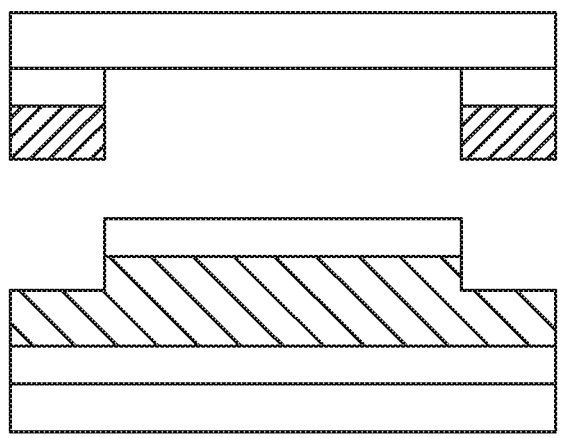

In FIG. 1A, the polyolefin sealant layers of each of the first and second films are facing each other. In FIG. 1B, the polyolefin two sealant layers are fused in a sealing area 30 (i.e., a seal). FIG. 1C illustrates the sealing area 30 following application of a force to pull the first and second films apart. As can be seen in FIG. 1C, the first film and second film are separated by a cohesive failure within the coupling layer 12 of the first film. Alternatively, or in addition, a cohesive failure could occur in the coupling layer 22 of the second film 20, in some embodiments.

In various embodiments the multilayer structure (formed of the first film 10 and the second film 20) has a thickness from 50 microns to 250 microns. All individual values and subranges from 50 to 250 microns are included; for example, the multilayer structure can have from a lower limit of 50 microns, 70 microns, 100 microns or 120 microns to an upper limit of 250 microns, 220 microns, 200, or 160 microns.

In various embodiments, a polyolefin sealant layer (e.g., polyolefin sealant layer 13 and/or polyolefin sealant layer 23) can be formed of a polymer selected from the group consisting of a polyethylene polymer, a polyethylene copolymer, a polybutylene polymer, a polybutylene copolymer, a polypropylene polymer or a polypropylene copolymer, or a combination thereof.

In various embodiments, the sealant layer can be formed from 1 to 100 weight percent one or more polymers selected from LLDPE, olefin-based plastomers and ionomers and, optionally, from 1 to 50 weight percent one or more materials selected from COC, HDPE and PP and PP based copolymers. All individual values and subranges from 1 to 100 weight percent one or more polymers selected from LLD PE, olefin-based plastomers and ionomers are included and disclosed herein; for example, the amount of such components may range from a lower limit of 1, 15, 30, 45, 60, 75 or 90 weight percent to an upper limit of 10, 25, 40, 55, 70, 85 or 100 weight percent. For example, the amount of one or more polymers selected from LLD PE, olefin-based plastomers and ionomers can be from 1 to 100 weight percent, or in the alternative, from 50 to 100 weight percent, or in the alternative, from 1 to 50 weight percent, or in the alternative, from 25 to 75 weight percent, or in the alternative, from 40 to 80 weight percent. When present, the amount of one or more materials selected from COC, HDPE and PP can range from 1 to 50 weight percent. All individual values and subranges from 1 to 50 weight percent are included and disclosed herein; for example, the amount of such components can range from a lower limit of 1, 10, 20, 30 or 40 weight percent to an upper limit of 5, 15, 25, 35, 45 or 50 weight percent. For example, the amount of one or more materials selected from COC, HDPE and PP can range from 1 to 50 weight percent, or in the alternative, from 1 to 25 weight percent, or in the alternative, from 25 to 50 weight percent, or in the alternative, from 10 to 25 weight percent.

In some embodiments, the sealant layer is formed from 1 to 100 weight percent one or more polymers selected from LLDPE, olefin-based plastomers and ionomers and, optionally, from 20 to 99 weight percent one or more materials selected from LDPE. All individual values and subranges from 1 to 100 weight percent one or more polymers selected from LLDPE, olefin-based plastomers and ionomers are included and disclosed herein; for example, the amount of such components may range from a lower limit of 1, 15, 30, 45, 60, 75 or 90 weight percent to an upper limit of 10, 25, 40, 55, 70, 85 or 100 weight percent. For example, the amount of one or more polymers selected from LLD PE, olefin-based plastomers and ionomers can be from 1 to 100 weight percent, or in the alternative, from 50 to 100 weight percent, or in the alternative, from 1 to 50 weight percent, or in the alternative, from 25 to 75 weight percent, or in the alternative, from 40 to 80 weight percent. All individual values and subranges from 20 to 99 weight percent one or more materials selected from LDPE are included and disclosed herein; for example, when present, the amount of one or more materials selected from LDPE may range from a lower limit of 20, 30, 40, 50, 60, 70, 80 or 90 weight percent to an upper limit of 25, 35, 45, 55, 5, 75, 85, 95 or 99 weight percent. For example, when present, the amount of one or more materials selected from LDPE may range from 20 to 99 weight percent, or in the alternative, from 50 to 99 weight percent, or in the alternative, from 20 to 50 weight percent.

In some embodiments, the sealant layer can consist of a HDPE. Exemplary HDPE include those sold under the trade name, DOWLEX including DOWLEX 2050B and DOWLEX 2049B, commercially available from The Dow Chemical Company. However, in some embodiments, the sealant layer can consist of a LDPE. Exemplary LDPE include 640i, LDPE 219M, LDPE 132i, LDPE 515E, LDPE 301E, all commercially available from The Dow Chemical Company.

As used herein, a coupling layer (e.g., coupling layer 12 and/or coupling layer 21) can include polyolefin and a maleic anhydride grafted (MAH) polymer. The polyolefin can be selected from the group consisting of a high pressure low density polyethylene, a high density polyethylene, an ethylene acrylic acid copolymer, an ethylene(meth)acrylic acid copolymer, propylene based plastomers, ionomers or a combination thereof.

In various embodiments, the polyolefin of the coupling layer can be formed any one or more polymer blends, each of which comprises a first polymer (e.g., an elastomeric propylene based polymer) and a second polymer, where the second polymer is selected from the group consisting of high pressure low density polyethylene, high density polyethylene, ethylene acrylic acid copolymers, ethylene (meth) acrylic acid copolymers and combinations thereof. Various combinations of such polymer blends are described, for example, in U.S. Pat. No. 7,863,383 and PCT Publication W02013101931, the disclosures of which are incorporated herein by reference.

That is, the polyolefin in the coupling layer can include at least two polyolefins (e.g., a blend of two or more polyolefins). For example, the polyolefin in the coupling layer can include a polypropylene-based plastomer and a low density polyethylene (LDPE), in some embodiments. The polypropylene-based plastomer can be from 50 weight percent to 73.4 weight percent of a total weight percent of the polyolefin in the coupling layer and the LDPE can be from 25 weight percent to 49 weight percent of the total weight of the polyolefin in the coupling layer. All individual values and subranges from 50 to 73.4 weight percent and similarly from 25 to 49 weigh percent are included. For example, the polyolefin layer can include from approximately 73.4 weight percent of the polypropylene-based plastomer and approximately 25 weight percent of the LDPE or from approximately 50 weight percent of the polypropylene-based plastomer and approximately 49 weight percent of the LDPE, among other possibilities.

The polyolefin in the coupling layer can be from 50 weight percent to 95 weight percent of a total weight of the coupling layer. All individual values and subranges from 50 to 95 weight percent are included. In some embodiments, the polyolefin in the coupling layer can be from 50 weight percent to 70 weight percent and/or 65 weight percent of a total weight of the coupling layer. For example, when the polyolefin in the coupling layer comprises from 50 weight percent to 70 weight percent of the polyolefin in the coupling layer the polyolefin can be particular a polymer blend (see, e.g., Resin 8 in the Examples).

In various embodiments, the polyolefin in the coupling layer has a density (as measured in accordance with ASTM D792) of from 0.860 grams/centimeter$^3$ to 0.930 grams/centimeter$^3$ and a melt index from 0.5 grams/10 minutes to 5.0 grams/10 minutes. All individual values and subranges from 0.860 grams/centimeter$^3$ and 0.930 grams/centimeter$^3$ and similarly from 0.5 grams/10 minutes to 5.0 grams/10 minutes are included. For example, the polyolefin in the coupling layer can have a density of approximately 0.911 grams/centimeter$^3$. The polyolefin can, in some embodiments, include various additives such as antioxidant additives, among other types of additives.

As mentioned, the coupling layer includes an MAH polymer. Examples of MAH polymers include maleated polyethylene, maleated polypropylene, maleated styrene-ethylene-butene-styrene triblock copolymer, and maleated polybutadiene.

The MAH including in the coupling layer can be from 15 weight percent to 50 weight percent of a total weight percent of the coupling layer. All individual values and subranges from from 15 to 50 weigh percent are included. For example, the MAH can, in some embodiments, be from 30 weight percent to 50 weight percent of a total weight percent of the coupling layer or from 35 weight percent to 50 weight percent of a total weight percent of the coupling layer. In some embodiments the MAH can preferably be from 40 weight percent to 45 weight percent of a total weight of the coupling layer. Notably, the above described amounts of MAH (e.g., 30 to 50 weight percent) in a coupling layer of a multilayer film can, at least in part, desirably promote cohesive failure of the multilayer film.

The coupling layer (e.g., coupling layer 12 and/or coupling layer 22) can be from 1 micron to 30 microns thick. All individual values and subranges from 1 micron to 30 microns are included. For instance, in some embodiments, the coupling layer can be from 10 microns to 15 microns thick. In any case, the coupling layer (e.g., coupling layer 12) has a thickness that is desirably less than a combined thickness of a tie layer and a cohesive failure layer employed by other approaches such as those that do not employ MAH in a coupling layer.

As used herein, a barrier layer (e.g., barrier layer 11 and/or barrier layer 21) can include polyamide (PA), ethylene vinylalcohol (EVOH) and polyvinylidene chloride. For instance, in some embodiments a barrier layer can include 5 weight percent to 100 weight percent of a polymer selected from the group consisting of a polyamide, an ethylene vinyl alcohol or a combination thereof, where the weight percent is based on a total weight percent of the barrier layer. All individual values and subranges from 5 to 100 weight percent of the barrier layer are included; for example, the barrier layer can have from a lower limit of 5 weight percent, 10 weight percent, 20 weight percent, to an upper limit of 100 weight percent, 90 weight percent, or 80 weight percent, for example, depending upon a desired degree of a barrier property such as oxygen permeability.

In embodiments, the disclosure provides a film formed by adhesion of any embodiment of the multilayer structure disclosed herein to a substrate selected from the group consisting of monolayer and multilayer films. Lamination substrates includes OPET, BOPP, PA, BOPA, PVOH and other substrates. However, in some embodiments, a film can be formed by adhesion of respective layers of any embodiment of a multilayer structure disclosed herein without the presence of additional materials such as a substrate.

In embodiments, the disclosure provides a package including an element formed by a multilayer structure and/or multilayer film, as described herein. For example, the package can be a pouch and/or other type of food and/or beverage container, among other types of packages.

All parts and percentages are by weight unless otherwise indicated.

EXAMPLES

All parts and percentages are by weight unless otherwise indicated.

Analytical Methods:

Density, D, was measured according to ASTM-D 792.

Melt index, 12, is measured according to ASTM D-1238 at 190° C. and at 2.16 kg.

Figure 6A:
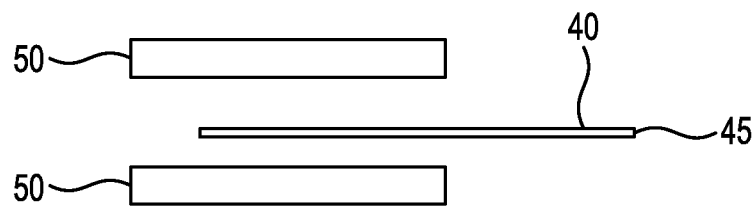
FIG. 6 illustrates a schematic of an example of equipment used to measure sealing force according to the present disclosure.
Figure 6B:
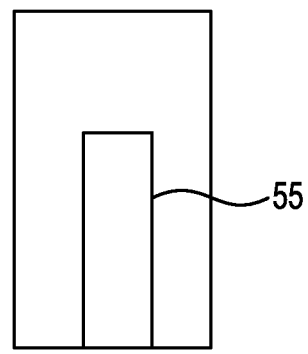
Figure 6C:
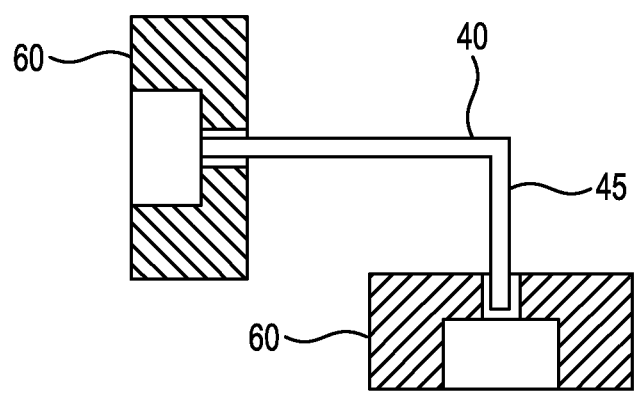

Initial seal force (i.e., peak seal strength)/seal force, is measured according to ASTM F88-94 and using the equipment schematically illustrated in FIGS. 6A-6C. FIG. 6 illustrates a schematic of an example of equipment used to measure sealing force according to the present disclosure. As can be seen in FIG. 6A a film having a first (top) layer 40 and a second (bottom) layer 45 is provided as well as two sealing bars 50. The sealing bars 50 are heated in accordance with ASTM F88 and pressed against opposite sides of the film to form a sealed area 55, as seen in FIG. 6B. FIG. 6C illustrates the process of opening the sealed area 55 using pulling mechanisms 60 one each on the first layer 40 and second layer 45. As shown in FIG. 6C, an amount of force required to separate a multilayer film, such as those described herein, by cohesive failure is measured in a direction that is perpendicular to a plane of the multilayer film in accordance with ASTM F88-94.

The following materials are principally used:

TABLE 1

Examples of materials principally used

| Resin | Type | I2@2.16 Kg_1 90° C. (g/10 min) | D (g/cm³) |
|---|---|---|---|
| Resin 1 | PA | 4.08 | 1.14 |
| Resin 2 | EVOH | 3.20 | 1.17 |
| Resin 3 | MAH grafted LLDPE | 3.00 | 0.912 |
| Resin 4 | MDPE | 1.00 | 0.926 |
| Resin 5 | LLDPE | 1.00 | 0.920 |
| Resin 6 | HDPE | 0.95 | 0.950 |
| Resin 7 | a blend of 73.4% polypropylene-based plastomer [I2 of 8.0 and D of 0.876 grams/centimeter³], and 25% LDPE [I2 of 2.0; D of 0.920 grams/centimeter³] | 3.5 | 0.900 |
| Resin 8 | a blend of 50% polypropylene-based plastomer [I2 of 2.0 and D of 0.876 grams/centimeter³], and 49% LDPE [I2 of 2.0; D of 0.925 grams/centimeter³] | 1.5 | 0.902 |

Five layer structures, having a multilayer structure designated as A/B/C/D/E were prepared to illustrate various comparative examples and working examples. As used herein, Layer C is a barrier layer, Layer D is a coupling layer, Layer E is a polyolefin sealant layer, and Layers A and B are additional layers with Layer B being a tie layer and Layer A being a polyolefin layer that is the outermost layer. As used herein, a tie layer refers to a layer including 30 weight percent or less MAH and a polyolefin carrier resin or an already diluted tie composition. Table 2 provides the structure and layer composition of comparative multilayer structures of comparative examples (CE 1-13) and working multilayer structures of working examples (WE 1-9). For example, as illustrated in Table 2, varying amounts of Resin 1 along with either Resin 7 or Resin 8 is used to make layer D (i.e., the coupling layer) in CE 1-13 and WE 1-9.

TABLE 2

Multilayer structures including a polyamide barrier layer.

| Layer | Thickness (μm) | CE 1 | CE 2 | CE 3 | CE 4 | CE 5 | CE 6 | CE 7 | WE 1 | WE 2 | WE 3 | WE 4 |
|---|---|---|---|---|---|---|---|---|---|---|---|---|
| A | 25 | 4 | 4 | 4 | 4 | 4 | 4 | 4 | 4 | 4 | 4 | 4 |
| B | 12.5 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 |
| C | 25 | 1 | 1 | 1 | 1 | 1 | 1 | 1 | 1 | 1 | 1 | 1 |
| D | 12.5 | 7 | 95% 7 5% 3 | 90% 7 10% 3 | 85% 7 15% 3 | 80% 7 20% 3 | 75% 7 25% 3 | 70% 7 30% 3 | 65% 7 35% 3 | 60% 7 40% 3 | 55% 7 45% 3 | 50% 7 50% 3 |
| E | 25 | 6 | 6 | 6 | 6 | 6 | 6 | 6 | 6 | 6 | 6 | 6 |

| Layer | Thickness (μm) | CE 8 | CE 9 | CE 10 | CE 11 | CE 12 | CE 13 | WE 5 | WE 6 | WE 7 | WE 8 | WE 9 |
|---|---|---|---|---|---|---|---|---|---|---|---|---|
| A | 25 | 4 | 4 | 4 | 4 | 4 | 4 | 4 | 4 | 4 | 4 | 4 |
| B | 12.5 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 |
| C | 25 | 1 | 1 | 1 | 1 | 1 | 1 | 1 | 1 | 1 | 1 | 1 |
| D | 12.5 | 8 | 95% 8 5% 3 | 90% 8 10% 3 | 85% 8 15% 3 | 80% 8 20% 3 | 75% 8 25% 3 | 70% 8 30% 3 | 65% 8 35% 3 | 60% 8 40% 3 | 55% 8 45% 3 | 50% 8 50% 3 |
| E | 25 | 6 | 6 | 6 | 6 | 6 | 6 | 6 | 6 | 6 | 6 | 6 |

TABLE 3

Multilayer structures including an ethylene vinyl alcohol (EVOH) polymer barrier layer.

| Layer | Thickness (μm) | CE 14 | CE 15 | CE 16 | CE 17 | CE 18 | CE 19 | CE 20 | WE 10 | WE 11 | WE 12 | WE 13 |
|---|---|---|---|---|---|---|---|---|---|---|---|---|
| A | 25 | 4 | 4 | 4 | 4 | 4 | 4 | 4 | 4 | 4 | 4 | 4 |
| B | 12.5 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 |
| C | 25 | 2 | 2 | 2 | 2 | 2 | 2 | 2 | 2 | 2 | 2 | 2 |
| D | 12.5 | 7 | 95% 7 5% 3 | 90% 7 10% 3 | 85% 7 15% 3 | 80% 7 20% 3 | 75% 7 25% 3 | 70% 7 30% 3 | 65% 7 35% 3 | 60% 7 40% 3 | 55% 7 45% 3 | 50% 7 50% 3 |
| E | 25 | 6 | 6 | 6 | 6 | 6 | 6 | 6 | 6 | 6 | 6 | 6 |

| Layer | Thickness (μm) | CE 21 | CE 22 | CE 23 | CE 24 | CE 25 | CE 26 | CE 27 | WE 14 | WE 15 | WE 16 | WE 17 |
|---|---|---|---|---|---|---|---|---|---|---|---|---|
| A | 25 | 4 | 4 | 4 | 4 | 4 | 4 | 4 | 4 | 4 | 4 | 4 |
| B | 12.5 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 | 70% 5 30% 3 |
| C | 25 | 2 | 2 | 2 | 2 | 2 | 2 | 2 | 2 | 2 | 2 | 2 |
| D | 12.5 | 8 | 95% 8 5% 3 | 90% 8 10% 3 | 85% 8 15% 3 | 80% 8 20% 3 | 75% 8 25% 3 | 70% 8 30% 3 | 65% 8 35% 3 | 60% 8 40% 3 | 55% 8 45% 3 | 50% 8 50% 3 |
| E | 25 | 6 | 6 | 6 | 6 | 6 | 6 | 6 | 6 | 6 | 6 | 6 |

Table 3 provides the structure and layer composition of comparative multilayer structures of comparative examples (CE 14-27) and working multilayer structures of working examples (WE 10-17). For example, as illustrated in Table 3, varying amounts of Resin 3 along with either Resin 7 or Resin 8 is used to make layer D (i.e., the coupling layer) in CE 14-27 and WE 10-17.

The films formed from the multilayer structure herein were produced in a blown film Collin Line. For example, WE 1 is a multilayer film formed by adding respective amounts of Resin 1, Resin 3, Resin 4, Resin 5, Resin 6, and Resin 7 in particular layers utilizing a blown film Collin Line to form a resultant film comprised of a multilayer structure. The resultant film (e.g., the top film) was sealed to a commercially available thermoforming film, composed by a standard structure always with a polyethylene resin as sealant layer (e.g., the bottom film. Specifically, Layer E of the resultant film was sealed to the olefin layer of the commercially available thermoforming film using Brugger sealing equipment with a seal time of 1 second, at 300 newtons, and a sealing temperature of 140 degrees Celsius (° C.) to form the multilayer film of WE 1, following standards described at ASTM F88. Working Examples 2-17 and Comparative Examples 1-27 were produced with the same procedure as WE 1 but using the respective components and amounts thereof as specified in Tables 2 and 3.

Notably, in each of the WEs 1-17 a barrier layer (i.e., Layer C) is directly on a coupling layer. That is, the coupling layer, at least in part due to the presence of a particular amount of MAH in the Working Examples provides desired adhesion properties, in contrast to other approaches that may employ an additional layer (e.g., a tie layer) between a layer that is delaminate/fail and a barrier layer (e.g., including PA and/or EVOH that is to provide an oxygen or other type of barrier).

Desirably, having the barrier layer directly on the coupling layer can comparatively reduce an overall thickness of a multilayer structure including the same and/or ease manufacture of the multilayer structure while still providing a desired performance (e.g., maintaining oxygen barrier properties and/or cohesively failing when included in a multilayer film to which force is applied).

Figure 2:
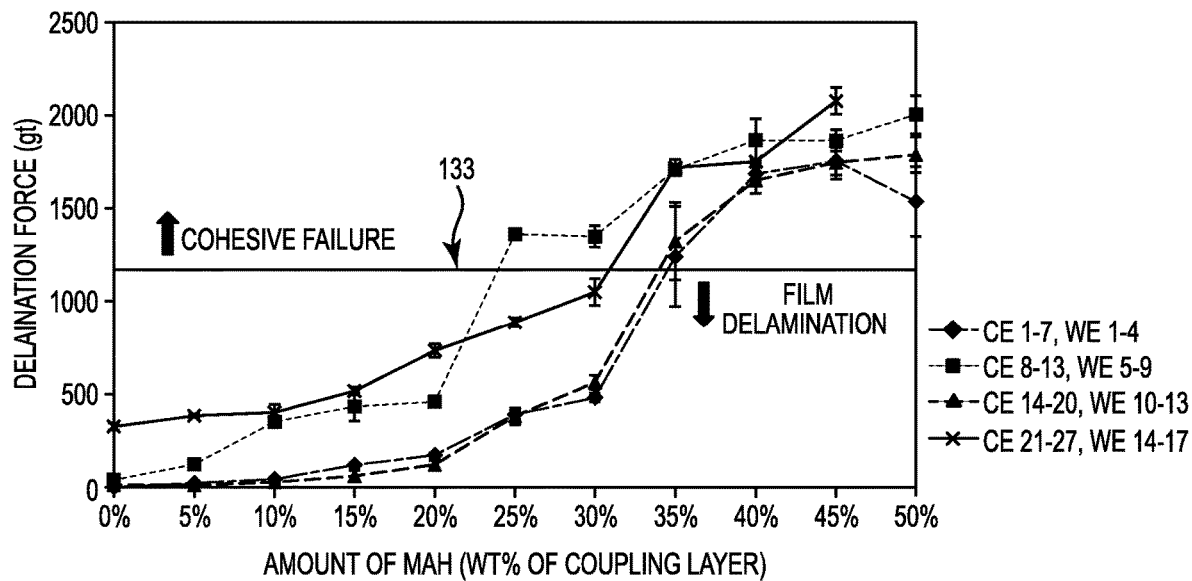
FIG. 2 illustrates a relationship between an amount of delamination force and an amount of maleic anhydride grafted (MAH) polymer included in a coupling layer according to the present disclosure.

Each of the WEs 1-17 and the CEs 1-27 were cut to form a specimen with 25.4 mm long sealing bar having a width of 5 millimeters (unless otherwise specified) and were opened in a standard universal testing machine using the procedure described in ASTM F88. With regard to a type of opening (cohesive failure or film delamination) the results are illustrated in FIG. 2. For example, as shown in FIG. 2, a multilayer film including a multilayer structure with a coupling layer having a particular amount of MAH polymer (e.g., from 30 weight percent to 50 weight percent of a total weight percent of the coupling layer) can cohesively fail, a desired effect for final application. Whereas, multilayer films of the same multilayer structure (A, B, C, D, E) but with comparatively less MAH (e.g., from 0 weight percent to 25 weight percent of a total weight percent of the coupling layer) can undergo film delaminate instead of cohesively failing.

Specifically, as illustrated in FIG. 2, WEs 1-17 which cohesively fail, are each located above line 133, while CEs 1-27 are each located below line 133. In this manner, line 133 serves as a visual representation of an approximate force (approximately 11.77 newtons (N/10 millimeters); approximately 1200 gram-force) that demarcates between the CEs 1-27 which each undergo film delamination (having a sealing force of less than approximately 11.77 N/10 millimeters), in contrast to, the WEs 1-17 that each experience cohesive failure (having a sealing force of greater than approximately 11.77 N/10 millimeters; more specifically from 11.77 N to approximately 21.57 N i.e., approximately 1200 gram force to approximately 1700 gram force/per 10 millimeters). Such cohesive failure may be desirable for various applications as it provide a mechanically consistent and aesthetically desired manner of opening a film and/or a multilayer film in contrast to film delamination which may be associated with mechanically inconsistent opening and/or aesthetically undesired opening (e.g., having jagged and/or irregular edges around the opening).

Figure 3:
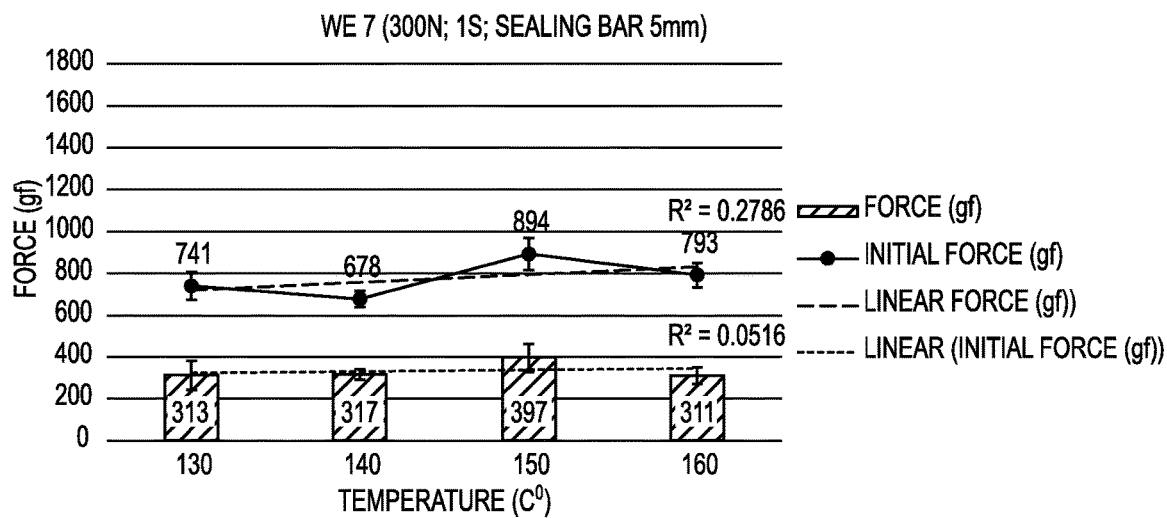
FIG. 3 illustrates an example of a relationship between an amount of sealing force and temperature according to the present disclosure.
Figure 4:
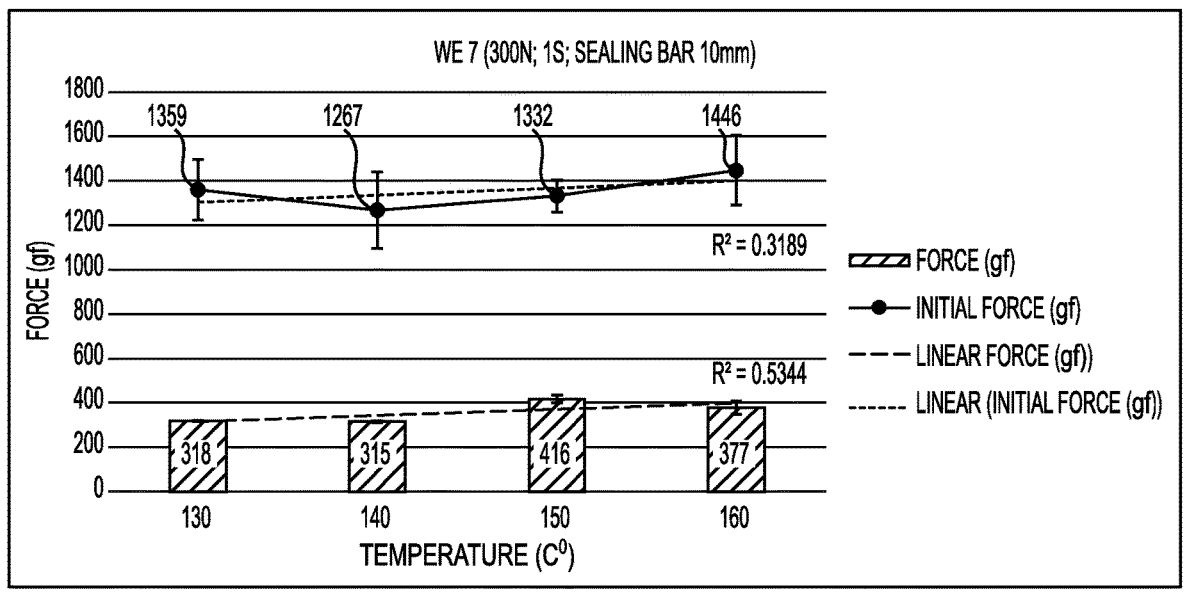
FIG. 4, illustrates another example of a relationship between an amount of sealing force and temperature according to the present disclosure.

Moreover, it is noted that the WEs 1-17 exhibited a broad seal window; that is the multilayer films of WEs 1-17 can be used in a broad range of sealing temperatures 130° C. to 160° C. without a substantial increase in the sealing force of the multilayer film. As used in this context, "substantially increase" means an increase of 40% or less in sealing force (initial opening force (i.e., initial force) and/or overall opening force (i.e., force) with a corresponding with an increase of 30° C. in sealing temperature. For example, as illustrated in FIG. 3, the multilayer film (a five-millimeter-thick sealing bar of the composition of WE 7) has an initial opening force (i.e., peak opening force) of approximately 7.27 N (approximately 741 gram-force) at 130° C. and an initial opening force of approximately 7.78 N (approximately 793 gram-force) at 160° C. Non-substantial increases were observed for each of the WE 1-17. Similarly, as illustrated in FIG. 4, the multilayer film (a ten-millimeter-thick sealing bar of the composition of WE 7) has an initial opening force of approximately 13.33 N (approximately 1359 gram-force) at 130° C. and an initial opening force of approximately 14.18 N (approximately 1446 gram-force) at 160° C.

Figure 5:
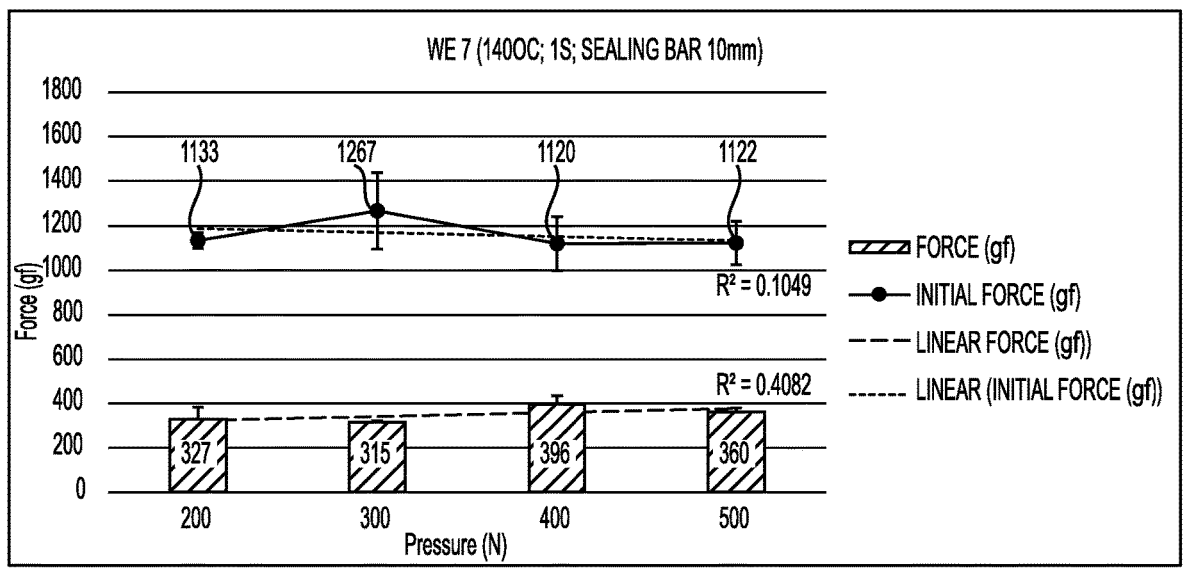
FIG. 5, illustrates a relationship between sealing force and pressure according the present disclosure.

Additionally, as shown in FIG. 5, the WEs 1-17 exhibit a broad seal window in terms of sealing force applied when forming the sealing bar; that is the multilayer films of WEs 1-17 can be formed over a broad range of sealing forces during formation of the sealing bar without a substantial increase and/or decrease in a sealing force of the multilayer film. As used in this context, "substantially increase" means an increase of 10% or less in sealing force (initial opening force (i.e., initial force) and/or overall opening force (i.e., force) with a corresponding with an increase of 300 N of sealing force. Similarly, as used in this context, "substantially decrease" means a decrease of 10% or less in sealing force (initial opening force (i.e., initial force) and/or overall opening force (i.e., force) with a corresponding with an increase of 300 N of sealing force.

Accordingly, the multilayer films of WEs 1-17 provide the desired the cohesive failure manner of opening while also providing a broad seal window (in terms of temperature and/or pressure dependency) and yet employ fewer layers than other approaches due at least in part to a barrier layer being directly coupled to the coupling layer without intervening components (e.g., without an intervening tie layer) thereby promoting ease of manufacturer and/or a multilayer film having a relatively smaller thickness than other films that employ intervening components.

What is claimed:
1. A multilayer structure comprising:
   a polyolefin sealant layer;
   a coupling layer on the polyolefin sealant layer, where the coupling layer includes a polyolefin and a maleic anhydride grafted (MAH) polymer, where the total amount of MAH polymer is from 15 weight percent to 50 weight percent of a total weight percent of the coupling layer; where the polyolefin is from 50 weight percent to 85 weight percent of a total weight of the coupling layer and the polyolefin comprises at least two polyolefins including a polypropylene-based plastomer which comprises from 50 weight percent to 73.4 weight percent of a total weight percent of the polyolefin and a low density polyethylene (LDPE) which comprises from 25 weight percent to 49 weight percent of a total weight of the polyolefin; and a barrier layer directly on the coupling layer.

2. The multilayer structure of claim 1, where the coupling layer is from 1 micron to 30 microns thick or where the coupling layer is from 10 microns to 15 microns thick.

3. The multilayer structure of claim 1, where the polyolefin has a density of from 0.860 grams/centimeter$^3$ to 0.930 grams/centimeter$^3$ and a melt index from 0.5 grams/10 minutes to 5.0 grams/10 minutes.

4. The multilayer structure of claim 1, where the barrier layer includes 5 weight percent to 100 weight percent of a polymer selected from the group consisting of a polyamide, an ethylene vinyl alcohol or a combination thereof, where the weight percent is based on a total weight percent of the barrier layer.

5. The multilayer structure of claim 1, where the multilayer structure has a thickness from 50 microns to 250 microns.

6. The multilayer structure of claim 1, where the polyolefin sealant layer is formed from a polymer selected from the group consisting of a polyethylene polymer, a polyethylene copolymer, a polybutylene polymer, a polybutylene copolymer, a polypropylene polymer or a polypropylene copolymer, or a combination thereof.

7. A film comprising the multilayer structure of claim 1.

8. A multilayer film comprising:

a first film; and a second film, where at least the first film or the second film includes:

a polyolefin sealant layer;

a coupling layer on the polyolefin sealant layer, where the coupling layer includes a polyolefin and a maleic anhydride grafted (MAH) polymer in a range from 35 weight percent to 50 weight percent of a total weight percent of the coupling layer, where the polyolefin further comprises a blend of polypropylene-based plastomer and a low density polyethylene (LDPE), where the multilayer film is to cohesively fail along at least a portion of an interface between the first film and the second film; and a barrier layer directly on the coupling layer.

9. The multilayer film of claim 8, where the MAH polymer further comprises from 40 weight percent to 45 weight percent of a total weight of the coupling layer.

10. The multilayer film of claim 8, where the at least the first film or the second film has a total number of layers from three layers to five layers.

11. The multilayer film of claim 8, where the interface has an initial seal strength of about 11.77 newtons/10 millimeters to about 21.57 newtons/10 millimeters.

12. The multilayer film of claim 8, where the multilayer film is laminated to a substrate.

13. A package including the multilayer film of claim 8.

* * * * *